US006850820B2

(12) United States Patent
Tajima (10) Patent No.: US 6,850,820 B2
(45) Date of Patent: Feb. 1, 2005

(54) DISTRIBUTED POWER GENERATION SYSTEM, AND MAINTENANCE SYSTEM AND MAINTENANCE METHOD UTILIZING THE SAME

(75) Inventor: Osamu Tajima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 61 days.

(21) Appl. No.: 10/134,362

(22) Filed: Apr. 22, 2002

(65) Prior Publication Data

US 2002/0192516 A1 Dec. 19, 2002

(30) Foreign Application Priority Data

Apr. 25, 2001 (JP) ........................................ 2001-128384

(51) Int. Cl.[7] .............................. H01M 8/04; G05F 5/00
(52) U.S. Cl. ......................... 700/286; 700/22; 700/20; 700/297; 429/22
(58) Field of Search ........................... 700/20, 22, 286, 700/287, 292–298; 702/57–62, 64, 65, 81, 82, 84; 429/22; 705/57–62, 64, 65, 81, 82, 84

(56) References Cited

U.S. PATENT DOCUMENTS

| | | | | |
|---|---|---|---|---|
| 4,700,081 A | * | 10/1987 | Kos et al. ..................... 290/44 |
| 5,311,562 A | * | 5/1994 | Palusamy et al. ............ 376/215 |
| 5,754,033 A | * | 5/1998 | Thomson ....................... 322/45 |
| 6,141,629 A | * | 10/2000 | Yamamoto et al. .......... 702/187 |
| 6,208,040 B1 | * | 3/2001 | Mardirossian ................ 307/72 |
| 6,322,917 B1 | * | 11/2001 | Acker ........................... 429/17 |
| 6,383,670 B1 | * | 5/2002 | Edlund et al. ................ 429/20 |
| 6,625,589 B1 | * | 9/2003 | Varma et al. ................. 706/45 |
| 2001/0056315 A1 | * | 12/2001 | Nagafuchi et al. .......... 700/286 |
| 2002/0087220 A1 | * | 7/2002 | Tveit et al. .................... 700/22 |

FOREIGN PATENT DOCUMENTS

| | | |
|---|---|---|
| JP | 02-066226 | 12/1991 |
| JP | 10-008402 | 7/1999 |

OTHER PUBLICATIONS

Notification of Refusal for Japanese Patent Application No. 2001–128384 from Japan Patent Office, including English translation.

* cited by examiner

Primary Examiner—Leo Picard
Assistant Examiner—Sean Shechtman
(74) Attorney, Agent, or Firm—Christensen O'Connor Johnson Kindness PLLC (57) ABSTRACT

Distributed power generation systems are connected via the Internet to a managing apparatus in a managing company. The managing apparatus successively acquires and monitors the operation status of each distributed power generation system. The managing apparatus directly changes the control parameters or the sequence program of each distributed power generation system to perform necessary maintenance.

17 Claims, 8 Drawing Sheets

| SETTING NAME | QUANTITY OF RAW FUEL SUPPLY | QUANTITY OF WATER SUPPLY FOR REFORMING | .. |
|---|---|---|---|
| SETTING A | 1 | 2 | .. |
| SETTING B | 2 | 2.5 | .. |
| : | : | : | : |

| ELECTRIC CURRENCY OF CELL | VOLTAGE OF CELL | FLOW OF SOURCE FUEL | FLOW OF WATER FOR REFORMING | IONIC CONDUCTIVITY OF WATER USED FOR PROCESS | ... | DIAGNOSIS ID |
|---|---|---|---|---|---|---|
| — | — | — | — | — | ... | 0001 |
| NORMAL | NORMAL | BELOW 3 | — | OVER 1.0 | ... | 0002 |
| ... | ... | ... | ... | ... | ... | ... |

| DIAGNOSIS ID 230 | PARTY TO BE NOTIFIED 232 | NOTIFICATION LEVEL 234 | PART NEEDED TO BE MAINTAINED 236 | COUNTERMEASURE 238 |
|---|---|---|---|---|
| 0001 | MAINTENANCE COMPANY | 2 | ION EXCHANGING RESIN | REPLACEMENT |
| 0002 | USER | — | AIR FILTERS | CLEANING |
| 0003 | DISTRIBUTED POWER GENERATION SYSTEM | — | CONTROL PARAMETERS | SETTING B |
| .. | .. | .. | .. | .. |

| USER ID 250 | IP ADDRESS OF APPARATUS 252 | e-mail ADDRESS 254 | START OF USE 256 | MAINTENANCE COMPANY 258 | MAINTENANCE RECORD 1 260 | ... |
|---|---|---|---|---|---|---|
| 0001 | 100.100.200.XX | taro@xx.com | 2001/04/10 | "A" COMPANY "a" BRANCH | CONTROL PARAMETERS ARE CHANGED TO SETTING "A" (2001/04/15) | ... |
| 0002 | 200.200.200.XX | hanako@xx.com | 2001/04/11 | "A" COMPANY "c" BRANCH | — | ... |
| .. | .. | .. | .. | .. | .. | .. |

DISTRIBUTED POWER GENERATION SYSTEM, AND MAINTENANCE SYSTEM AND MAINTENANCE METHOD UTILIZING THE SAME

BACKGROUND OF THE INVENTION

1. Field of the Invention

The present invention relates to a maintenance technology of a power generation system, and it particularly relates to a distributed-type power generation system and a maintenance system and maintenance method utilizing the distributed-type power generation system.

2. Description of the Related Art

Today new technologies, such as IT (Information Technology) and biotechnology, are making their appearance one after another on the global scene. Despite such a trend, the energy industry remains one of the largest basic industries. Recently, along with the growing awareness of the global warming and other environmental problems, the human society is placing great hopes on the so-called new energies. In addition to their environmental aspects, the new energies present such advantages as low transmission loss and security of power supply because their energy production can be distributed close to power consumers. Moreover, it is expected that developing the new energies have a secondary effect of creating new peripheral industries.

Serious efforts to develop new energies began on the heels of the oil crisis of about 30 years ago. Today, the new energies, whose development is entering the stage for practical applications, include, for instance, the reproducible energy from solar power generation, the recycling energy from wastes power generation, the high-efficiency energy from fuel cells, and the energies in new areas such as for clean energy cars.

Of these, the fuel cell energy is one of the energies attracting particular attention of the industry. The fuel cell produces electricity and heat at the same time, using a chemical reaction of atmospheric oxygen to hydrogen made by mixing water vapor into natural gas or methanol. This mode of power generation produces only water as the byproduct and is highly efficient in the low-output range and stable without being affected by the weather. The solid polymer fuel cells, whether for home or other stationary use or vehicular use, are considered to be one of the standard energy sources in the nest generation.

The power generation systems using solid polymer fuel cells are today on the way for practical applications after trial manufacture. The wider use of the fuel cells depends on cost reduction. While the initial cost is the problem to be solved by the developers, the operation cost and the merit of their use depend on the running cost and the lifetime of systems using the fuel cells.

Thus, to realize the wide use of fuel cells, it is not only necessary to technically improve the fuel cells themselves, but also to create a business model structuring the environment in which the fuel cells are used. It is particularly necessary to prepare an appropriate and efficient maintenance scheme of the power generation systems for stable and long-term supply of electric power.

SUMMARY OF THE INVENTION

The present invention has been made in view of the foregoing circumstances and an object thereof is to provide a technology that promotes the introduction and use of distributed-type power generation systems using fuel cells or like energy sources.

A preferred embodiment according to the present invention relates to a distributed-type power generation system. This system has a generator therein and comprises a communication unit which communicates with a network, a control unit which controls the generation capacity of the generator and a change instructing unit which changes the set point values, which are set parameters, or the sequence program of the control unit to keep or enhance the generation capacity in accordance with an instruction issued via the network. The "generator" may be an arbitrary power generator, and a fuel cell in which stable generation capacity can be expected serves as one of suitable and preferred examples. The set point values are changed to keep the desirable output of the power generator. The power generator setting is, for example, changed to increase the output in order to compensate for the decrease of the generation capacity caused with the elapse of time. Changing a control sequence according to the improvement of operation controlling method aiming high efficiency generation can be considered as an example of the change of the sequence program.

This system may further comprise a table which pre-stores the set point values for keeping the generation capacity according to the situation or condition of the power generator. The change instructing unit may refer to this table in issuing the instruction to change the setting.

Another preferred embodiment according to the present invention relates to a maintenance system. This system comprises a managing apparatus, which is connected via a network to distributed power generation systems each of which has a generator, and changes the set point values or a part of the sequence program of a power generator to keep the generation capacity.

Still another preferred embodiment according to the present invention relates also to a maintenance system. This system comprises a distributed power generation system which includes a generator, a managing party connected to the distributed power generation systems via a network which remotely controls the generation capacity of the generator and a maintenance party which maintains the distributed power generation systems.

"Party" is a body, entity or apparatus working for its purpose. The managing party generates necessary maintenance information based on the information of the operation status of the distributed power generation system, and directly changes the set point values or the sequence program thereof or requests the maintenance party to perform necessary maintenance in accordance with the content, seriousness, type and so forth of the generated information.

The maintenance information may comprise a part or a component in trouble or failure, the cause of trouble, a remedy for the trouble, the item of the maintenance and so forth. The necessary maintenance comprises the change of the control parameters or the sequence program, which should be performed by directly controlling the distributed power generation system, and the replacement or the inspection of parts, which should be requested to the maintenance party.

The maintenance can be performed efficiently and trouble can be prevented because the managing party watches or monitors the operation status of each distributed power generation system and selects an appropriate maintenance solution when the maintenance is needed.

The managing party may specify the necessary maintenance information according to the change of the distributed power generation system, which is caused with the elapse of time or aging. The managing party may decide whether it is necessary or not to perform the maintenance such as regular inspection, the replacement of an exhausted part, the cleaning of filters by detecting beforehand information regarding the change of the distributed power generation system caused with the elapse of time.

The managing party may set parameters in the distributed power generation system to realize more desirable operation status in directly controlling the system. The operation status of the system can be kept desirable and the trouble can be avoided by directly setting the control parameters of the system.

The managing party may provide a first notification level in which it is notified that the maintenance is needed and a second notification level in which the information of the part that needs to be maintained is further notified, in requesting the maintenance party to perform the maintenance. The inspection of the entire system may be requested to the maintenance party by the first notification level when the cause of the trouble or malfunction cannot be specified. The maintenance of the part is requested in the second notification level when it is possible to specify the part which needs to be inspected or replaced. This method improves the job efficiency of the maintenance party.

The managing party may notify recommendable maintenance operation not via the maintenance party but directly to a user if the maintenance required can be performed easily. Speedy and efficient maintenance can be realized for easy tasks such as filter cleaning without the help of the maintenance party.

Still another preferred embodiment according to the present invention relates to maintenance method. This method watches or monitors the operation status of each distributed power generation system which has a generator therein. This method directly changes the set point values or the sequence program of the distributed power generation system or requests a maintenance party in charge of the maintenance of the system to perform the maintenance when necessary.

It is to be noted that any arbitrary replacement or substitution of the above-described structural components and the steps, expressions replaced or substituted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
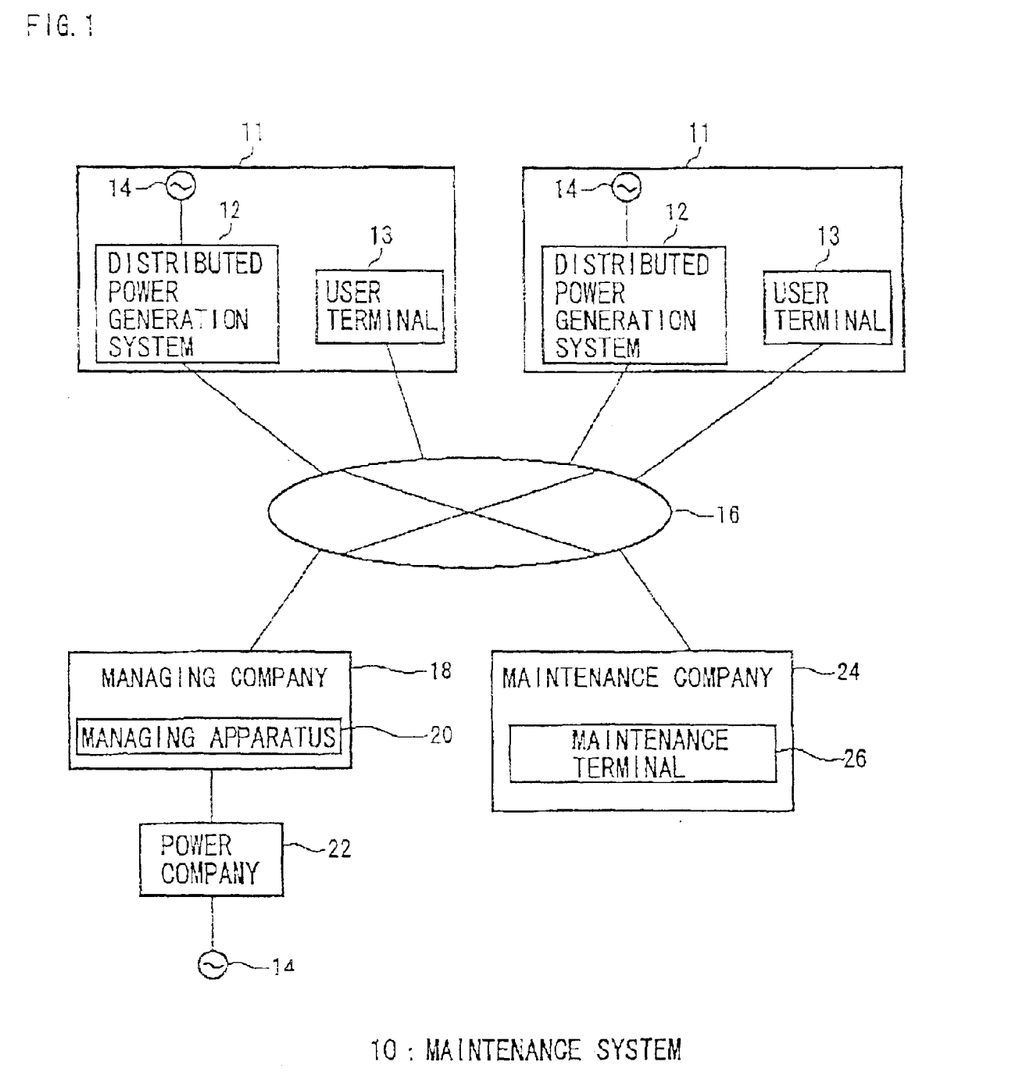
FIG. 1 shows a general structure of a maintenance system according to a preferred embodiment of the present invention.

FIG. 1 shows the general structure of a maintenance system 10 according to a preferred embodiment of the present invention. FIG. 1 shows an ordinary electronic network, not a network for power transmission. In the maintenance system 10, a user's home 11 is provided with a distributed power generation system 12 and a user terminal 13, which are both connected to the Internet 16. Moreover, to the Internet 16 connected are a managing company 18 which comprises a managing apparatus 20 that manages and controls the distributed power generation systems 12 and a terminal 26 equipped in a maintenance company 24 which is in charge of the maintenance of the distributed power generation system 12 (hereinafter referred simply to as a "maintenance terminal"). The managing company 18, which is connected to a power company 22 by a dedicated line, carries out business commissioned by the power company 22. The power company 22 supplies electric power over a commercial power system 14 to houses or buildings of consumers who have the distributed power generation systems 12. The maintenance company 24 maintains the distributed power generation systems 12 receiving requests from the managing apparatus 20 or the users. Each distributed power generation system 12 is equipped with a fuel cell system which is expected to provide stable and highly efficient power generation.

In the maintenance system 10, the managing apparatus 20 successively acquires the operation status of each distributed power generation system 12 and diagnoses the status thereof. The managing apparatus 20 changes directly the set point values or the sequence program of the distributed power generation system 12 or requests the maintenance company 24 to perform the maintenance in accordance with the degree or seriousness of necessary maintenance when it interprets that the maintenance is needed. The maintenance may be performed by the user by notifying the user terminal 13 when the system 12 can be sufficiently maintained only with easy maintenance work such as filter cleaning.

The business relation described above can prevent trouble of the distributed power generation systems 12 and can provide speedy countermeasures when the trouble occurs. Structuring the business model according to this embodiment of the present invention is significant for the wider use of the distributed power generation systems 12 in each home and company because it is necessary to prepare the maintenance system for the stable supply of electric power.

Figure 2:
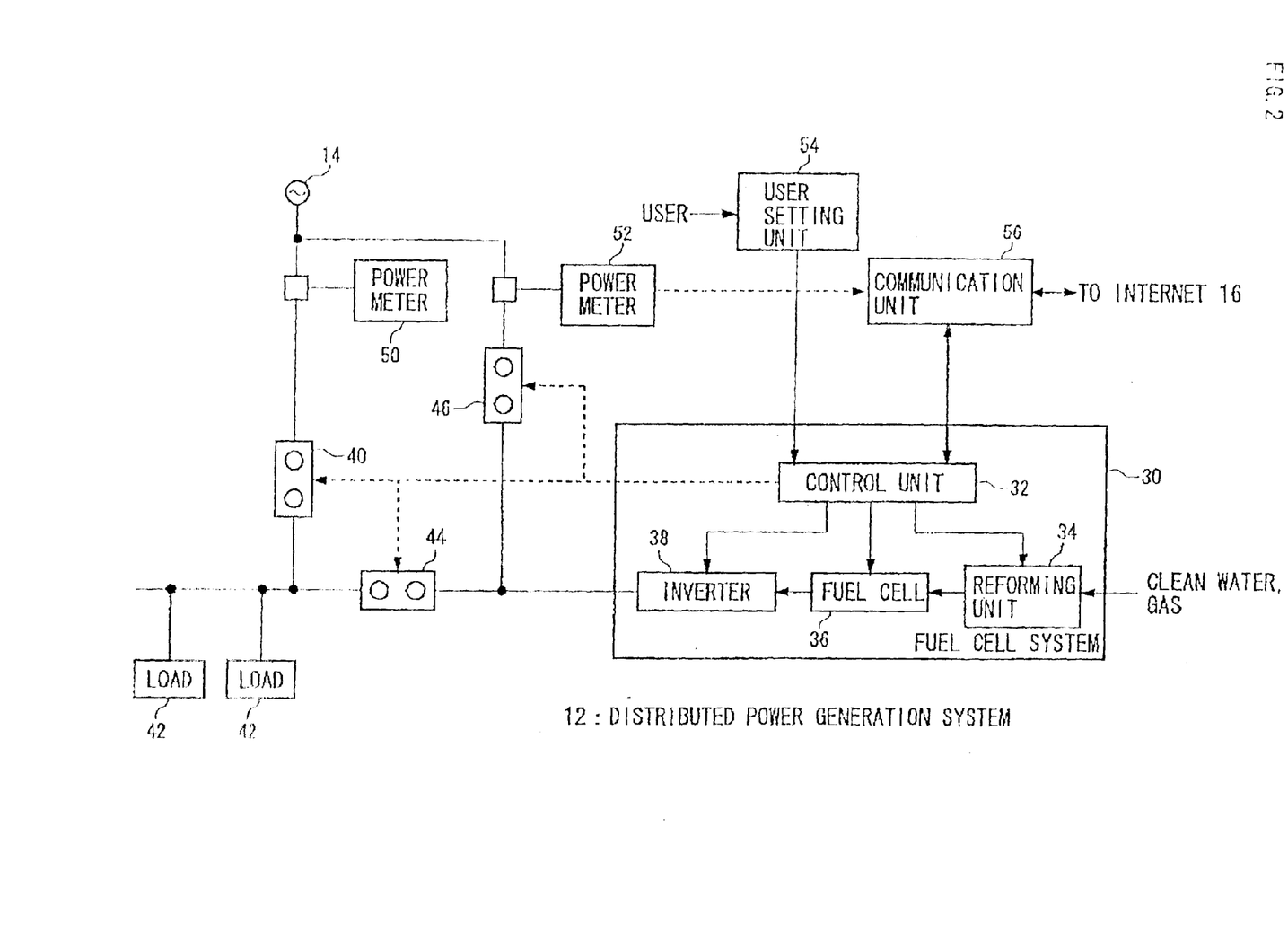
FIG. 2 shows a structure of a distributed power generation system according to a preferred embodiment of the present invention.

FIG. 2 shows the structure of the distributed power generation system 12. A fuel cell system 30 comprises a reforming apparatus 34 which produces hydrogen by having water vapor made from clean water react to natural gas, methanol or the like, a fuel cell 36 which produces water and direct-current electric power from the reaction of the hydrogen on oxygen, an inverter 38 which converts the DC power into alternating-current electric power and a control unit 32 which controls the whole procedure. The reforming apparatus 34 comprises a desulferizing unit, a reforming unit, a carbon monoxide transformer and a carbon monoxide remover and so forth.

A user setting unit 54 receives a user's instruction and conveys it to the control unit 32. The instruction may be such that instructs to change the parameters which control the operation of the fuel cell system 30 for the maintenance or may be such that controls the output of the fuel cell system 30 given in such a mode as "maximum output," "intermediate output" or "output halt" for selling surplus electric power. The control unit 32 controls respective portions of the fuel cell system 30 according to the instruction in selling the surplus electric power.

A communication unit 56 receives instructions from the managing apparatus 20 and conveys them to the control unit 32. These instructions (referred to as "remote instructions" hereinafter) are issued by the managing apparatus 20 in order to maintain the fuel cell systems 30. The control unit 32 changes control parameters according to the remote instruction and controls respective portions according to the changed parameters. Electric power can be stably supplied and the trouble of parts can be maximally avoided because the appropriate parameters are selected according to the operation status of the fuel cell system 30. It is to be noted that the control unit 32 is not required to control all of the reforming apparatus 34, the fuel cell 36 and the inverter 38.

The communication unit 56 transmits the operation status of the fuel cell system 30 to the managing apparatus 20 via the Internet 16. The information of the fuel cell system 30 successively transmitted to the managing apparatus may comprise: the output AC electric power and AC voltage; the flow of raw or source fuel; the electric current, the voltage and the temperature of the fuel cell; the temperature of each reactor in the reforming apparatus; the temperature of cooling water for the cell; the temperature of hot water tank; the ionic conductivity of water used for the process; the controlled output values of each pump and blower; other control parameters and so forth.

A first switch 40, which is provided in a path between the power system 14 and a load 42, is closed or made "on" when electric power is purchased from the power system 14. A second switch 44, which is provided in a path between the fuel cell system 30 and the load 42, is closed when power is supplied from the fuel cell system 30 to the load 42. A third switch 46, which is provided in a path between the fuel cell system 30 and the power system 14, is closed when power is to be reversed. The opening and closing of the first switch 40 are generally opposite to those of the second switch 44. The third switch 46 is closed only when the first switch 40 is open in FIG. 2. These three switches are controlled by the control unit 32. A first power meter 50 meters the purchased electric power. A second power meter 52 meters the reversed electric power. These structures are provided in consideration of the case in which electric power is sold from the distributed power generation system 12.

Figure 3:
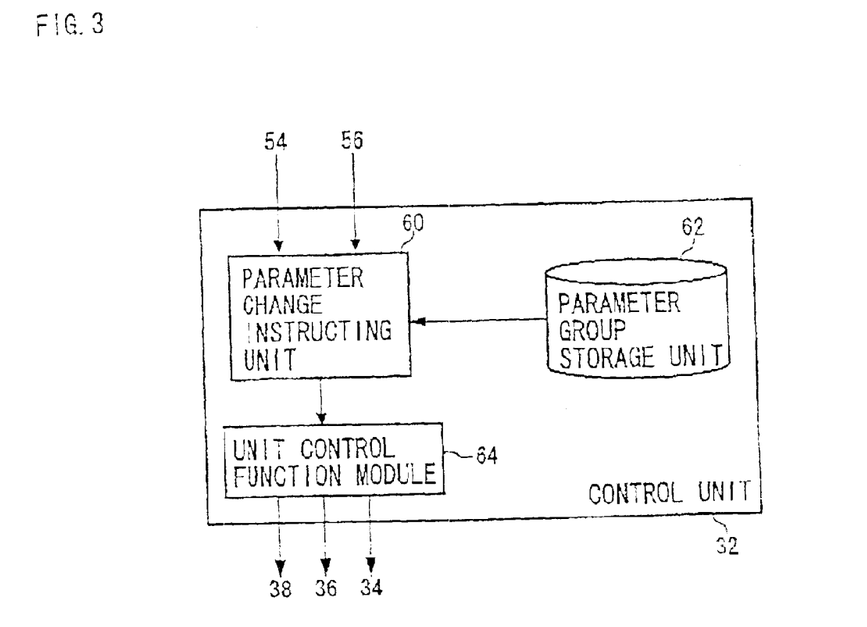
FIG. 3 shows a structure of a control unit in the distributed power generation system.

FIG. 3 shows the structure of the control unit 32. The function of the control unit 32 is realized by hardware, such as a microcomputer, memory and other LSIs, and/or by software, such as a power generation controlling program and so forth. In FIG. 3, however, only functions are shown in blocks, which are realized by the combination of hardware and software. Thus, it should be understood by those skilled in the art that these functional blocks can be realized by various combinations of hardware and software.

A parameter change instructing unit 60 issues an instruction to change the control parameters or set point values used in a unit control function module 64 according to the user's instruction acquired via the user setting unit 54 or the remote instruction acquired via the communication unit 56. The instruction via the user setting unit 54 changes only the set point values of the control parameters regarding the output of electric power or hot water, such as the output electric power or the temperature of the hot water in the tank. The set point values for each process inside the system, on the other hand, are changed according only to the instructions via the communication unit 56, which are changed to maintain the distributed power generation system 12. The unit control function module 64 controls the reforming apparatus 34, the fuel cell 36 and the inverter 38 based on the control parameters. The parameter change instructing unit 60 may set the parameters putting higher priority on the remote instruction than on the instruction from the user when the remote instruction is issued.

Figure 4:
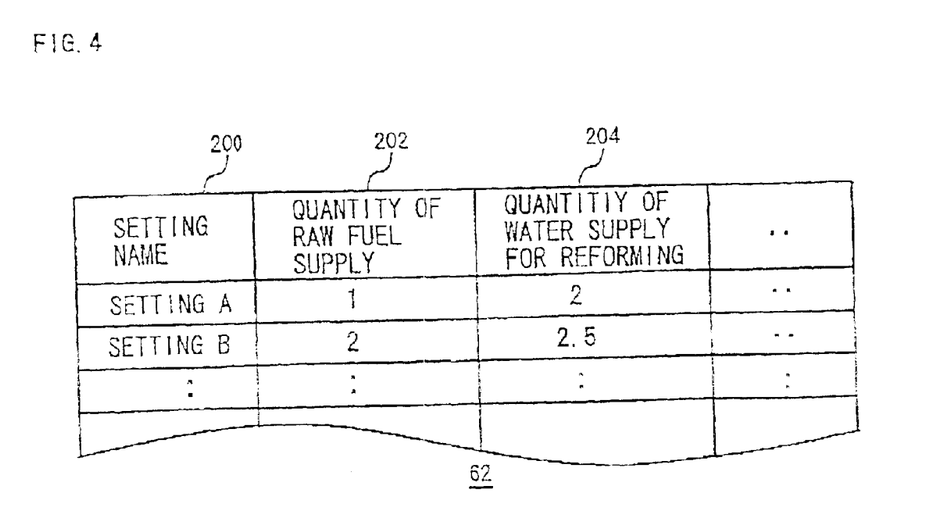
FIG. 4 shows a structure of a parameter group storage unit in the distributed power generation system.

A parameter group storage unit 62 stores the control parameters or set point values correspondent to each setting condition. FIG. 4 shows an example of the structure of the parameters storage unit 62. Cells or spaces for respective parameters are set in the unit 62, such as column 200 for the setting names, column 202 for the quantity of source fuel supply, column 204 for the quantity of water supply for reforming and so forth. The parameter groups to keep the generation capacity are preset in the respective rows for the parameters in accordance with the foreseeable status of the fuel cell system 30. "Setting A," for example, stores a parameter "1" for the quantity of the source fuel supply and a parameter "2" for the quantity of the water supply for reforming.

The managing apparatus 20 may specify directly the set point values (SVs) of the parameters which should be changed when issuing the remote instruction. The instruction which merely specifies a parameter group, such as "setting A," may also be given utilizing the parameter group storage unit 62. By this method, higher security can be realized by reducing possibility that the set point values are known from outside. Moreover, setting mistakes can be prevented by adopting simple instructions.

Figure 5:
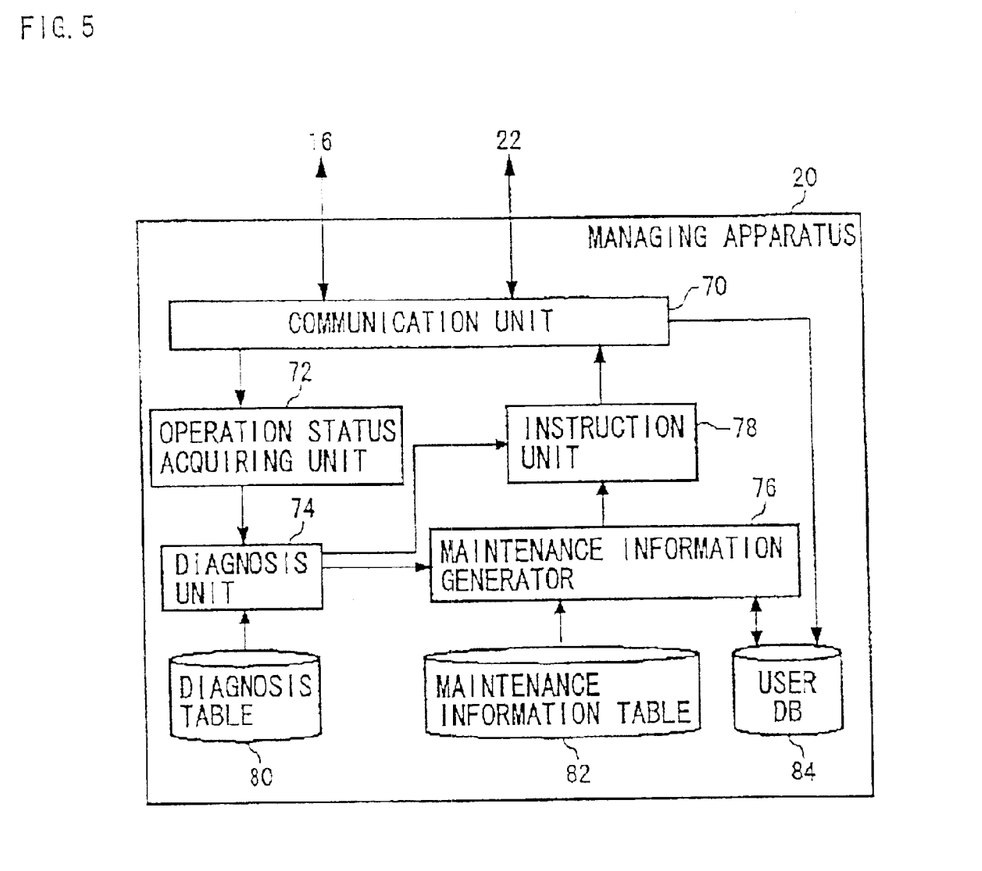
FIG. 5 shows a structure of a managing apparatus in a managing company.

FIG. 5 shows an example of the structure of the managing apparatus 20. This structure is also realized by a combination of a microcomputer and other hardware and software. A communication unit 70 communicates with each distributed power generation system 12 and the maintenance terminal 26 in the maintenance company over the Internet 16 and communicates directly with the power company 22.

The managing apparatus 20 mainly outputs following four pieces of information. The first piece comprises remote instructions which are transmitted to the control units 32 in the distributed power generation systems 12 in order to change the set point values thereof. The second piece comprises remote instructions which are transmitted to the control units 32 in the distributed power generation systems 12 in order to change the sequence program thereof. The third piece is maintenance information which is transmitted to the maintenance terminal 26 in the maintenance company 24 in order to request a countermeasure for trouble or maintenance. The maintenance information is the information regarding a part in trouble or in failure, the cause of the trouble, the countermeasure for the trouble and items of the maintenance. The fourth piece is the information of the electric power output by the distributed power generation system 12. These pieces of information are transmitted by the use of, for example, a connection-type transport layer protocol such as TCP/IP (Transmission Control Protocol/Internet Protocol) or e-mails.

A diagnosis table 80 stores information, such as PVs or process values, SVs or set point values and MVs or manipulation values of the distributed power generation system 12, which shows the operation status, and diagnosis IDs which show the condition of the distributed power generation system 12 in a manner that the information and the IDs are correspondent to each other.

Figure 6:
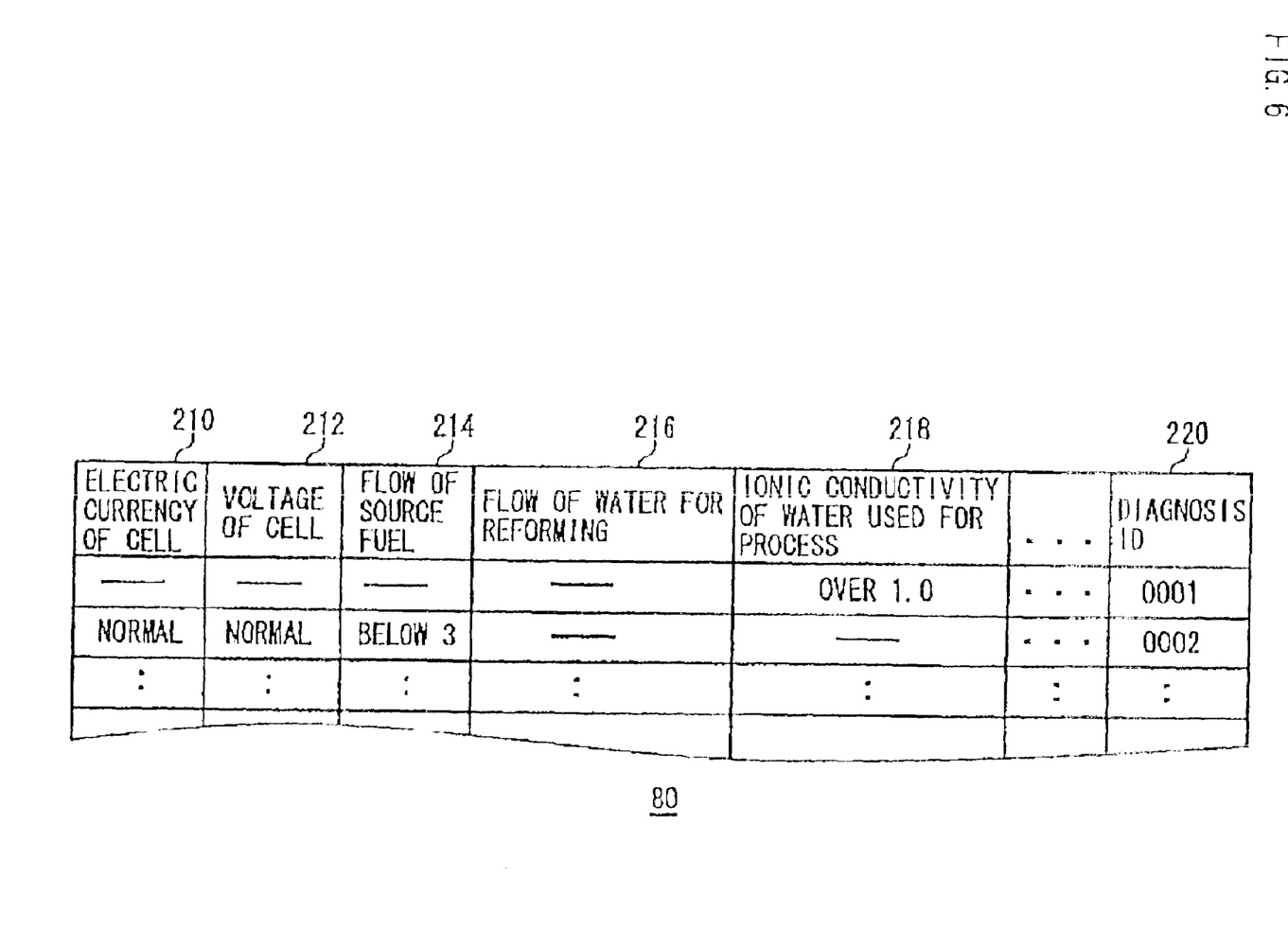
FIG. 6 shows an internal structure of a diagnosis table in the managing apparatus.

FIG. 6 shows an example of the structure of the diagnosis table 80. Cells for parameters or PVs which indicate the operation status are set, such as column 210 for the electric currency of the cell, column 212 for the voltage of the cell, column 214 for the flow of the source fuel, column 216 for the flow of the water for reforming and column 218 for the ionic conductivity of the water used for the process. Column 220 for the diagnosis IDs are also set. It is shown in the figure that, as an example, the diagnosis ID is "0001" when the ionic conductivity of the water used for the processing is "over 1.0" regardless of other parameters.

Figure 7:
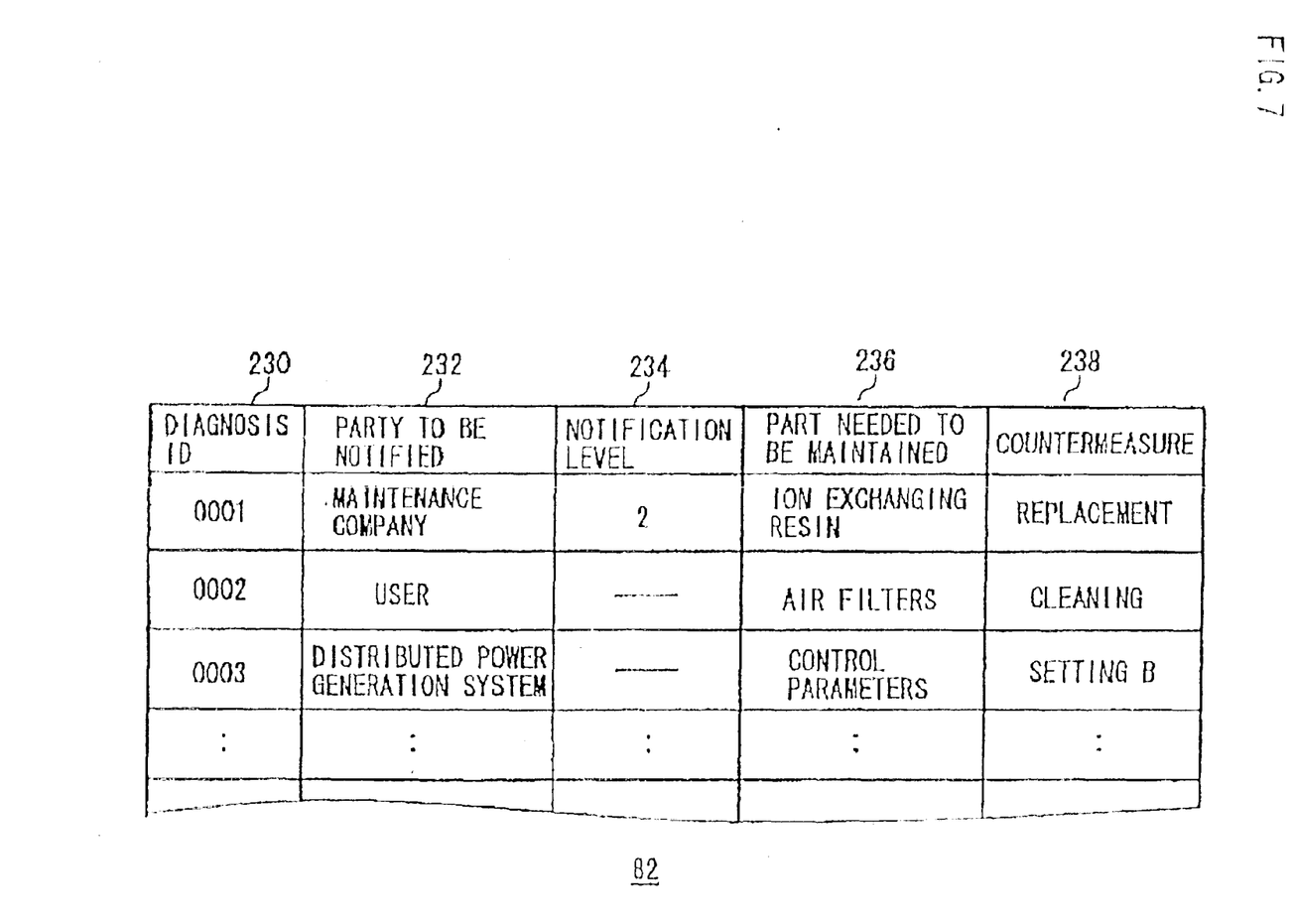
FIG. 7 shows an internal structure of a maintenance information table in the managing apparatus.

A maintenance information table 82 stores the diagnosis IDs and the information of the necessary maintenance corresponding to each diagnosis ID. FIG. 7 shows an example of the structure of the maintenance information table 82. Column 230 for the diagnosis IDs, column 232 for the parties to be notified, column 234 for notification levels, column 236 for parts need to be maintained and column 238 for countermeasures are set therein. It is shown in the figure that, as an example, the maintenance information at the notification level "2," which is the request to replace "ion exchanging resin," is sent to the "maintenance company" when the diagnosis ID is "0001".

Figure 8:
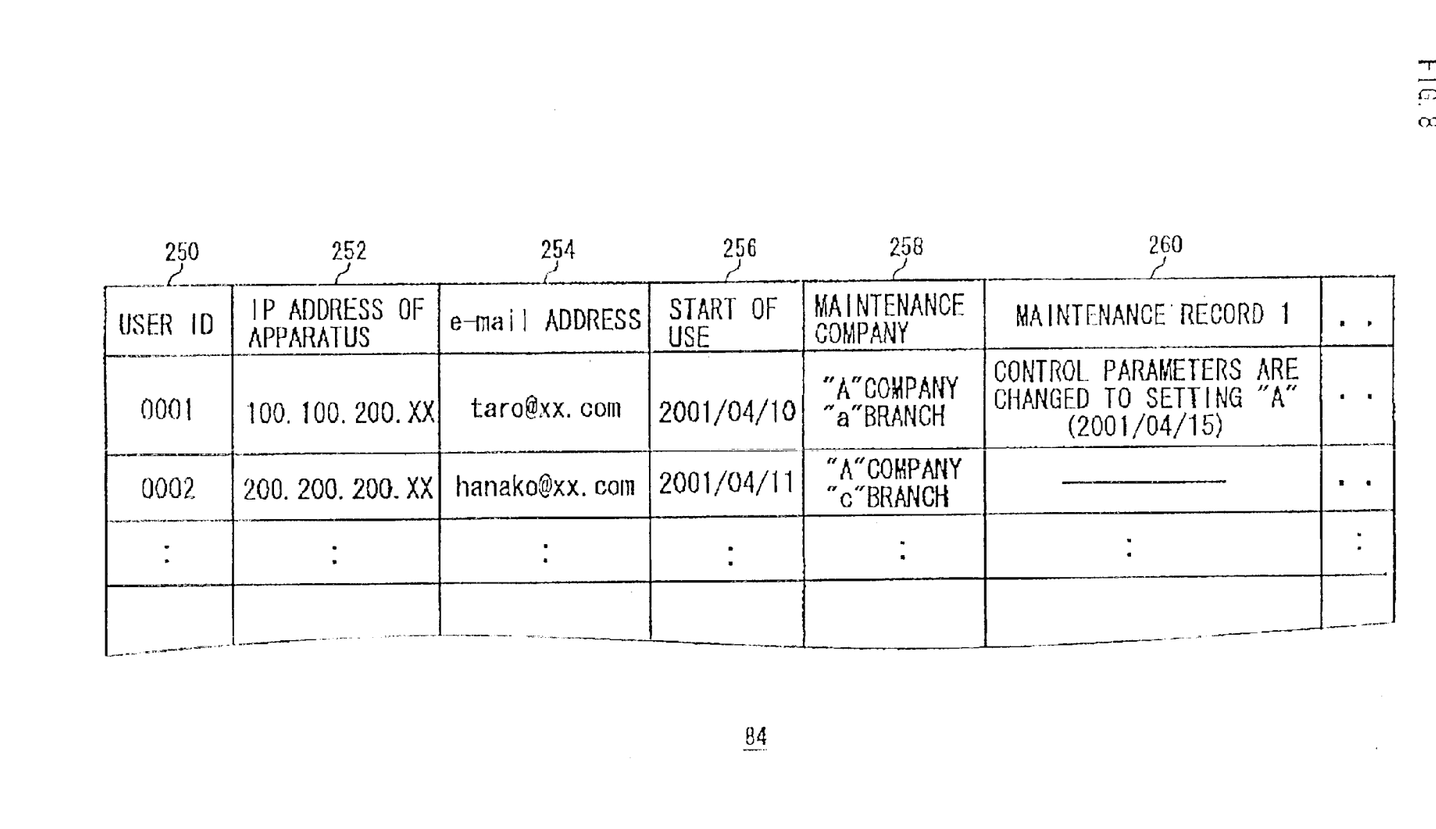
FIG. 8 shows an internal structure of a user database in the managing apparatus.

A user database 84 stores the information of the users of the distributed power generation systems 12. FIG. 8 shows an example of the structure of the user database 84. Column 250 for user IDs, column 252 for the IP addresses of the apparatus, column 254 for e-mail addresses, column 256 for the dates when the use of the systems 12 began, column 258 for the companies in charge of the maintenance and column 260 for the records of the maintenance are set in the table. A new cell in the column 260 is added every time after the maintenance is performed. It is shown, for an example, that the distributed power generation system 12 of the user of user ID "0001" has an assigned IP address "100.100.200.xx," and an e-mail address taro@xx.com, that the system 12 was started to be used on "Apr. 10, 2001", that the maintenance company is "a" branch of "A" company and that the record of the maintenance is read as "Control parameters are changed to setting A in Apr. 14, 2001". Other information may be stored in the user database 84, such as the names, addresses, ages, phone numbers, sexes, and families of the users.

An operation status acquiring unit 72 successively acquires the operation status of each distributed power generation system 12. It is sufficient that it is designed so that the kind, content and frequency of the information to be acquired become sufficient to maintain the system. The acquired information may be stored in an operation status database which is not shown in the figure. The distributed power generation system 12 or the user terminal 13 may be required to provide more detailed information when needed. The user may be requested, for example, about the condition of a component by an e-mail when the component is suspected to be fault. A picture shot with a digital camera may be requested.

A diagnosis unit 74 diagnoses the status of each distributed power generation system 12 by referring to the diagnosis table 80 based on the information acquired by the operation status acquiring unit 72. A maintenance information generator 76 generates necessary maintenance information based on the result of the diagnosis by the diagnosis unit 74.

The party to which the maintenance information is transmitted is at the same time determined according to the content of necessary maintenance. The information is, for example, transmitted to the user terminal 13 when the easy maintenance such as filter cleaning is required, transmitted to the distributed power generation system 12 when the necessary maintenance can be performed by merely changing the control parameters and transmitted to the maintenance company 24 when the necessary maintenance should be performed by the operator of the company, such as the replacement of the part. Speedy and efficient maintenance can be realized by selecting an appropriate route for the maintenance.

The instruction of changing the parameters or the sequence program of the distributed power generation system 12 is issued in a manner that the parameters or the sequence program which realizes more desirable operation status are selected by considering the present operation status, in giving the instruction to change the control parameters or the sequence program thereto. It is possible to specify the parameter group pre-stored in each distributed power generation system 12 when issuing the instruction as described above.

Part name may be informed to the maintenance company 24 when it is possible to specify the cause and the countermeasure of the trouble or the part needs to be maintained in requesting the company 24 to perform the countermeasure of the trouble or the necessary maintenance. The fact that the maintenance is needed may be solely informed to the maintenance company 24 when it is impossible to specify the cause and the countermeasure of the trouble or the part to be maintained. Setting several levels for the notification enables the maintenance company 24 to plan its schedule by forecasting the time or the manpower required for the maintenance. Moreover, the maintenance company 24 can improve its service efficiency by preparing parts for replacement previously or by sending an operator who has higher technique when it is impossible to detect the cause of the trouble.

The maintenance information generator 76 may specify the necessary maintenance information or estimate the cause or the trouble by reading out the information of the change caused with the elapse of time or the record of the trouble of the distributed power generation system 12 referring to the user database 84. The generator 76 may generate, for example, the maintenance information which directs the user of the distributed power generation system 12 to replace the filters if the system 12 has been used over a year and the replacement of the filters is not registered in the maintenance record. This method prevents the trouble or the decrease of the output caused with using the part even after its expiration date.

An instruction unit 78 transmits the generated maintenance information to the predetermined party via the communication unit 70. The instruction unit 78 may issue the instruction using a transmission protocol such as TCP/IP or an e-mail.

Figure 9:
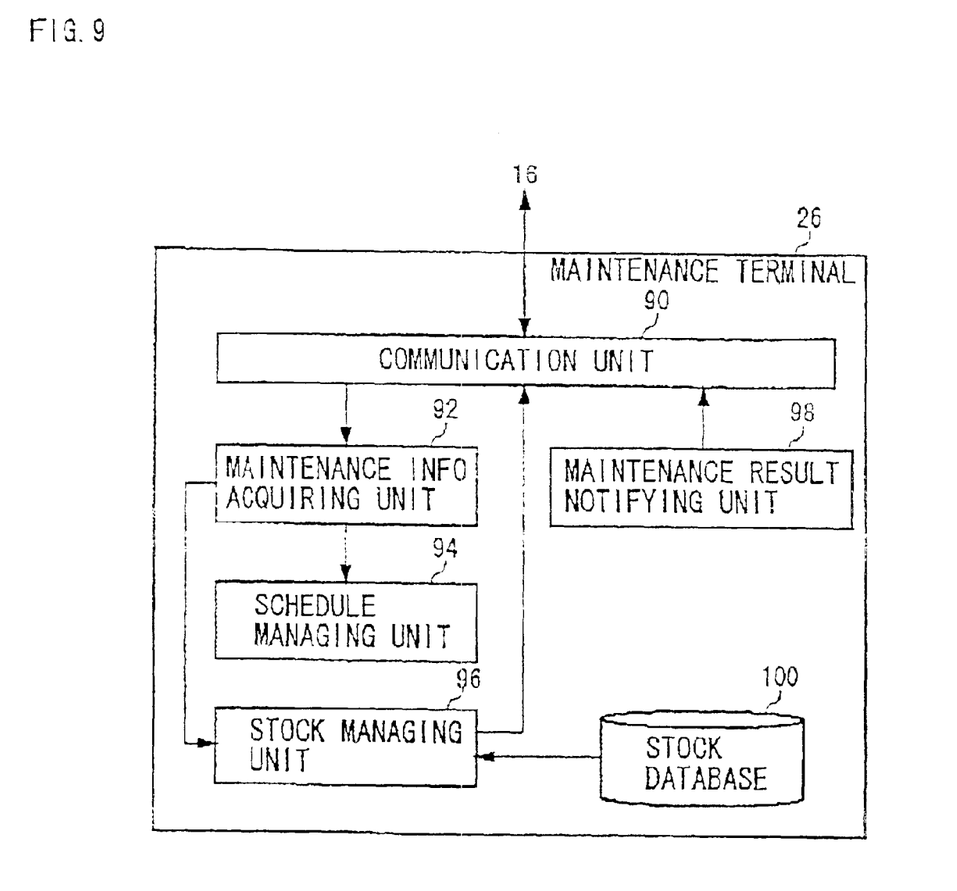
FIG. 9 shows a structure of a terminal equipped in a maintenance company.

FIG. 9 shows an example of the structure of the maintenance terminal 26. This structure is also realized by a combination of a microcomputer and other hardware and software. A communication unit 90 communicates with the managing apparatus 20 and the user terminate 13 via the Internet 16.

A maintenance information acquiring unit 92 acquires the maintenance information of each distributed power generation system 12 from the managing apparatus 20. A schedule managing unit 94 computes the schedules or the best routes of operators in charge of the maintenance based on the maintenance information. The schedule managing unit 94 assigns the maintenance work to each operator according to the content of the maintenance work and the addresses of the users. Maintenance work may be assigned to an operator who has high techniques when the maintenance information is given with the level in which the cause of the trouble is not specified.

The schedule managing unit 94, moreover, plans the schedules of the operators by estimating the time required for the maintenance based on the notification levels or contents of the maintenance information. The schedule managing unit 94 computes the routes for inspection of the operators in a day based on the time required for the maintenance and the addresses of the users and informs these routes to each operator. Parts or appliances necessary for the maintenance may be informed to the operators at the same time. This method can realize more efficient maintenance work. The information such as the addresses of the users may be stored in a database which is not shown in the figure or may be stored in the user database 84 in the managing apparatus 20.

The schedule managing unit 94 may inquire the user terminals 13 date and time when the users want to have the maintenance performed. The schedules of the operators may be adjusted according to the requested date and time. This method further improves the efficiency of the maintenance work by avoiding a situation where an operator visits a user's vacant home.

A stock managing unit 96 counts the number of parts necessary for the maintenance based on the maintenance information. The stock managing unit 96 refers to a stock database 100 which stores the number of parts being stocked and instructs to order parts in shortage. Parts may be ordered to a parts manufacturer not shown in the figure in an online or an offline manner.

A maintenance result notifying unit 98 informs the content of the maintenance performed by the operator and the status of the distributed power generation system 12 to the managing apparatus 20, which in turn stores the information into the user database 84 and utilizes the information when diagnosing the distributed power generation system 12 generating the maintenance information afterwards.

Hereunder describes an example of the operation of the maintenance system 10 according to the above-described structure. The operation status acquiring unit 72 in the managing apparatus 20 firstly acquires the information of the operation status of the distributed power generation system 12 possessed by a user who has the user ID "0001." Among the information, if the ionic conductivity of the water used for the process is over 1.0, the diagnosis unit 74 interprets that the distributed power generation system 12 is in the status specified by the diagnosis ID "0001" by referring to the diagnosis table 80 shown in FIG. 6. The result of the diagnosis is transmitted to the maintenance information generator 76. The maintenance information generator 76 generates the maintenance information which instructs the maintenance company to replace the ion exchanging resin. The company in charge of the maintenance of the distributed power generation system 12 is specified by referring to the user database 84 shown in FIG. 8 and finding out the user corresponding to the user ID "0001" based on the IP address of the distributed power generation system 12. The instruction unit 78 instructs the "a" branch of the "A" company to replace the ion exchanging resin of the distributed power generation system 12 of the user "0001". The maintenance information generator 76 adds the maintenance to the maintenance record of the user "0001" in the user database 84.

The maintenance information acquiring unit 92 in the maintenance terminal 26 acquires the request for the maintenance from the managing apparatus 20. The stock managing unit 96 checks the status of the stocks by referring to the stock database 100 of the ion exchanging resins and make an order to the company which sells the resins if necessary. The schedule managing unit 94 inquires the user "0001" date and time in which the user "0001" wants the maintenance to be performed and plans the schedule of the operator based on the specified date and time. The operator visits the home of the user "0001" preparing the ion exchanging resin beforehand and performs the maintenance.

The present invention has been described based on preferred embodiments. It should be understood by those skilled in the art that these embodiments are only exemplary and various modifications to each component, process and combination thereof are possible and that those modifications are effective as embodiments and are encompassed by the scope of the present invention.

The structure for the user to set the generation capacity is not indispensable though the distributed power generation system 12 according to the preferred embodiments of the present invention is provided with the user setting unit 54. For example, the generation capacity may be fixed, and the setting may be made automatically with a certain constant margin added in accordance with actual loads, thus various other setting methods may be implemented.

The managing company 18 and the power company 22 may be realized by a single party and a series of process may be performed synthetically. In this case, the system can be managed by structuring a web server and other host computers within the power company 22.

The managing company 18 and the power company 22 may be interconnected not necessarily by a dedicated line but over the Internet 16. Its design depends on the degree of security required for communications between the managing company 18 and the power company 22.

The distributed power generation system 12 may have the function of the user terminal 13 though they are provided separately in each user's home according to the present embodiment. Moreover, it is possible to structure a network which connects electric home appliances in the user's home and is connected to the internet via a home server.

Each operator may acquire information necessary for the maintenance by accessing to the managing apparatus 20 from his/her own terminal.

The distributed power generation system 12, which uses the fuel cell system 30 for power generation, may naturally use other generation means. For example, a solar cell system may be adopted as it gains high generation ability in the daytime of midsummer when the power demand normally peaks. It is possible that arranging the distributed power generation systems 12 in a wide area reduces the effect of the weather. Moreover, it is natural that various types of generating means may be provided in a mixed manner as the distributed power generation systems 12.

According to the present embodiments, a maintenance technology of high practical value and usability is realized.

Although the present invention has been described by way of exemplary embodiments, it should be understood that many changes and substitutions may be made by those skilled in the art without departing from the scope of the present invention which is defined by the appended claims.

What is claimed is:

1. A distributed power generation system, comprising:
   (a) a power generation system having a generator and a control unit which controls a performance of the generator;
   (b) a managing party, connected to the power generation system via a network, which manages an operation status of the power generation system;
   (c) a communication unit, connected to the network, which transmits an instruction from the managing party to the control unit; and
   (d) a user setting unit which transmits an instruction set by a user, which is based on a capacity of the power generation system, to the control unit;
   the control unit of the power generation system including:
      (i) a change instructing unit which changes set point values or a sequence program of the control unit in order to keep the generation capacity in accordance with an instruction to change a set point value of a control parameter regarding an output of electric power or hot water and an instruction to change a set point value for a process inside the distributed power generation system;
   wherein the instruction via the user setting unit changes only the set point value of the control parameter, and the set point value for the process inside the system is changed according only to the instruction via the communication unit.

2. A distributed power generation system according to claim 1, wherein said change instructing unit puts higher priority on a remote instruction than on the instruction from the user when the remote instruction is issued.

3. A distributed power generation system according to claim 1, wherein:
   the control unit further including a table which stores the set point value; and
   the control unit functions to change the set point value in response to the operation status of the power generation system referring to the table in order to maintain the performance of the power generation system.

4. A distributed power generation system according to claim 2, wherein:
   the control unit further including a table which stores the set point value; and
   the control unit functions to change the set point value in response to the operation status of the power generation system referring to the table in order to maintain the performance of the power generation system.

5. A distributed power generation system according to claim 1, wherein the generator comprises a fuel cell.

6. A distributed power generation system according to claim 2, wherein the generator comprises a fuel cell.

7. A distributed power generation system according to claim 3, wherein the generator comprises a fuel cell.

8. A distributed power generation system according to claim 4, wherein the generator comprises a fuel cell.

9. A maintenance system, comprising:
   a distributed power generation system according to claim 1;
   a managing party, connected to said distributed power generation system via a network, which remotely controls generation capacity of said distributed power generation system; and
   a maintenance party which maintains the distributed power generation system,
   wherein the managing party collects operation information regarding operation status of the distributed power generation system, generates necessary maintenance information based on the operation information, and changes the set point value of the control unit or the sequence program of the distributed power generation system via the network or requests the maintenance party to perform necessary maintenance in accordance with the maintenance information.

10. A maintenance system according to claim 9, wherein the managing party specifies the maintenance information necessary to cope with change of the distributed power generation system caused with elapse of time, and changes the set point value of the control unit or the sequence program of the distributed power generation system via the network or requests the maintenance party to perform necessary maintenance in accordance with the maintenance information.

11. A maintenance system according to claim 9, wherein the managing party changes the set point value of the control unit or the sequence program of the distributed power generation system in accordance with the maintenance information to realize desirable operation status in the distributed power generation system when controlling the distributed power generation system via the network.

12. A maintenance system according to claim 10, wherein the managing party changes the set point value of the control unit or the sequence program of the distributed power generation system in accordance with the maintenance information to realize desirable operation status in the distributed power generation system when controlling the distributed power generation system via the network.

13. A maintenance system according to claim 9, wherein the managing party sets, in requesting the maintenance party to perform the maintenance, a first notification level in which the maintenance party is notified a fact that the maintenance is needed and a second notification level in which the maintenance party is notified information of a part which needs the maintenance.

14. A maintenance system according to claim 10, wherein the managing party sets, in requesting the maintenance party to perform the maintenance, a first notification level in which the maintenance party is notified a fact that the maintenance is needed and a second notification level in which the maintenance party is notified information of a part which needs the maintenance.

15. A maintenance system according to claim 11, wherein the managing party sets, in requesting the maintenance party to perform the maintenance, a first notification level in which the maintenance party is notified a fact that the maintenance is needed and a second notification level in which the maintenance party is notified information of a part which needs the maintenance.

16. A maintenance system according to claim 12, wherein the managing party sets, in requesting the maintenance party to perform the maintenance, a first notification level in which the maintenance party is notified a fact that the maintenance is needed and a second notification level in which the maintenance party is notified information of a part which needs the maintenance.

17. A maintenance system according to claim 9, wherein the managing party notifies recommendable operation to the user when the necessary maintenance is easy to perform.

* * * * *